March 5, 1957  F. HALOSKI  2,784,292
HEAT CONTROL FOR IMMERSION HEATER
Filed June 30, 1955
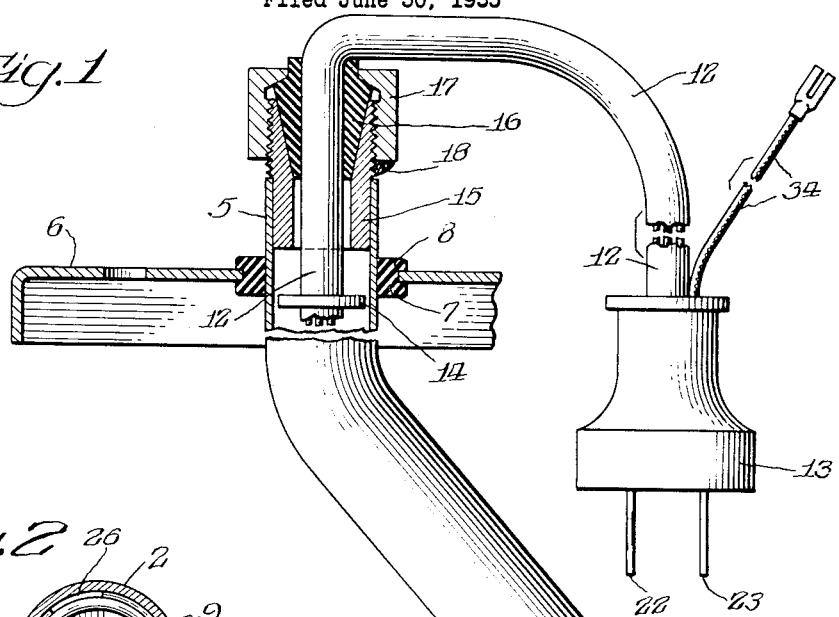
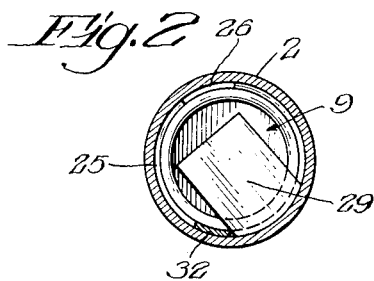
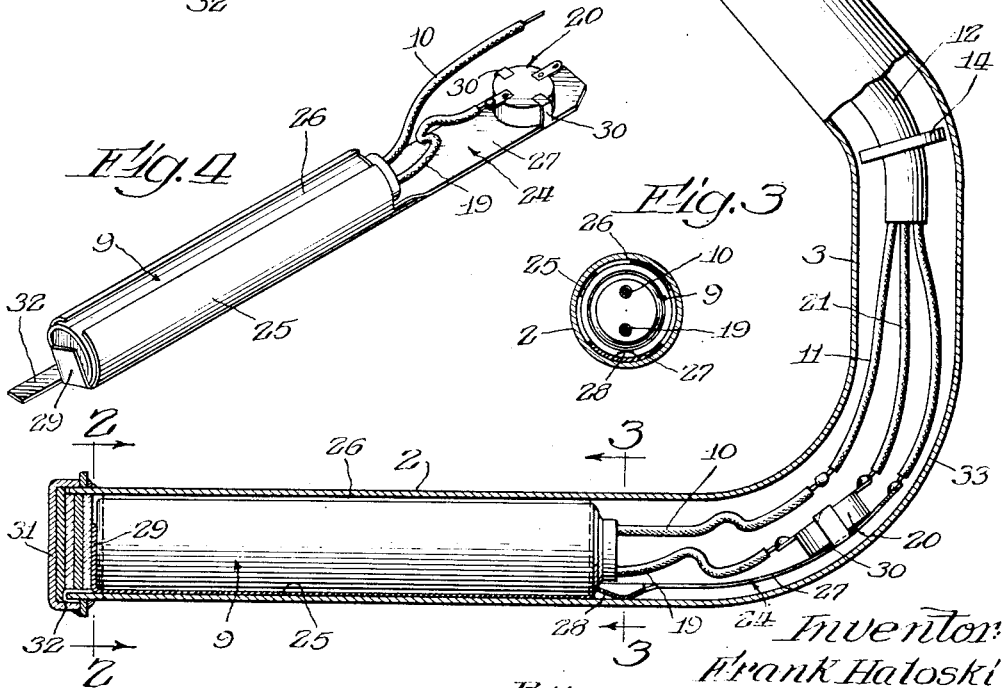
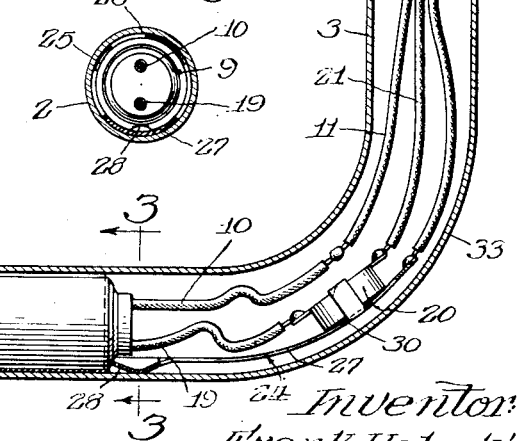
Inventor
Frank Haloski

United States Patent Office 2,784,292
Patented Mar. 5, 1957

2,784,292

HEAT CONTROL FOR IMMERSION HEATER

Frank Haloski, Chicago, Ill., assignor to Vacuum Can Company, Chicago, Ill., a corporation of Illinois Application June 30, 1955, Serial No. 519,188

5 Claims. (Cl. 219—41)

This invention relates to an immersion heater, and especially to an immersion heater which is designed for keeping foods hot in a storage container from which individual servings may be withdrawn, for example, liquid foods such as soup and coffee. A type of container which is extensively used for storing liquid foods and for keeping the same hot is a vacuum insulated container of the character shown in U. S. Patent 2,620,945 issued December 9, 1952. Such containers have a small diameter neck and mouth leading to a main body of much larger diameter so as to provide a large storage capacity (usually from 3 to 5 gallons for coffee service purposes) in the main body of the container; the relatively small neck and mouth serve to cut down the loss of heat by convection air currents.

The main objects of the present invention are to provide an immersion heater which will supply an adequate volume of heat to maintain at a substantially constant temperature, or at least within a very narrow range of temperatures for as long as desired an initally fairly large volume of liquid which is gradually reduced by dispensing cups or other measures of the liquid; to provide such a heater which will be operative to maintain liquid in a thermally insulated container within a very narrow range of temperatures notwithstanding variation in the volume of liquid remaining in the container from time to time, to provide a heater which is safe and durable and which will withstand rather rough and careless handling; and other objects and advantages of the invention will be understood by reference to the following specification and accompanying drawing wherein a selected embodiment of the invention is described and illustrated.

In the drawing (1 sheet) there is illustrated an immersion heater embodying a selected form of the invention. The drawing comprises:

Figure 1 which is a side view wherein certain parts are shown in section to illustrate certain details of construction;

Figures 2 and 3 which are cross sections respectively on planes represented by the lines 2—2 and 3—3; and Figure 4, which is perspective illustration of a unitary heat source and heat control which is embodied in the immersion heater.

The immersion heater shown in the drawing is an improvement on the heater shown in the copending application Ser. No. 435,399, filed June 9, 1954, by Burton O. Smith, now Patent 2,754,407, July 10, 1956. The improved heater comprises a tube 1 which is preferably but not necessarily of stainless steel, this being suitably bent to provide a lower, normally horizontal leg portion 2, upwardly extending and upwardly inclined portions 3 and 4 respectively, and an upper end, upwardly extending stem portion 5. The lower portions 2, 3, and 4 are of such form that although the horizontal dimension of the leg portion 2 of the heater from its free end to the outside of the upwardly extending portion 3 is much greater than the diameter of the mouth of the container into which the heater is to be inserted, the heater may be worked into the container by endwise movement of its leg portion 2 and gradual rocking of the device to an upright position in which the upper end leg portion 5 will be disposed substantially centrally or axially of the mouth of the container so that a cover 6 positioned on the stem part 5 may be seated on the mouth of the container.

The cover 6 is provided with a central opening 7 and a suitable rubber grommet 8 positioned in said opening 7 and detachably secured to the cover as illustrated in Figure 1. The grommet 8 snugly but slidably receives the stem part 5 of the immersion heater so that the heater may be adjusted up or down through the cover so as to position the lower leg 2 of the heater on the bottom of the container. It is to be observed that the stem part 5 is of adequate length for this purpose, a portion of said stem being broken away in the drawings in order to permit large scale illustration of the structure.

An electrical resistance heating cartridge 9 is housed in the lower leg 2 of the device and said heating unit is connected by a suitable electrical conductor 10 to a conductor 11 of a suitable three wire cable 12 which extends through the tube 1 and out of its upper end, terminating in a suitable electric connector plug 13. The cable 12 may be kept more or less centered in the tube 1 by means of a plurality of suitable supporting rings 14 through which the cable passes, as many of these being employed along the length of the cable as may be desired.

At the upper end of the tube 1, the entrance to the stem part 5 around the cable 12 is suitably sealed by means of an adaptor fitting 15 which may be a drive fit in the upper end of the stem 5 or brazed or otherwise suitably securely fastened in the end of the stem 5 so as to provide an air tight joint between the tube 1 and the adaptor 15. A rubber or other compressible sleeve or grommet 16 fits tightly about the cable 12 so as to provide an air tight joint between the sleeve and the cable, and said sleeve 16 is provided with an external, downwardly facing conical surface for fitting on a corresponding internal conical surface provided in the adaptor fitting 15 substantially as shown. A cap 17 screwed threadedly engages a portion of the adaptor fitting 15 and is operative, when screwed down on the adaptor, to press the sleeve 16 into tight seating engagement with both the adaptor fitting 15 and the cable 12 so as to produce the desired seal for the upper end of the stem 5. In some instances the sealing element 16 may have its upper end extended around the cord 12 for a short distance, say about 2 inches, to resist sharp bending of the cable 12, thereby to protect said cable against damage incident to such sharp bending. If desired the cap 17 may be locked in position by a spot of brazing or the like as indicated at 18.

The heating cartridge 9 has its other conductor 19 connected through a thermostatic control element 20 to a second conductor 21 of the cable 12. The conductors 11 and 12 are, of course, respectively connected to the contact prongs 22 and 23 of the electric connector plug 13.

The electric heater cartridge 9 and the thermostatic control element 20 are maintained in fixed relation to each other by means of a metal holder or mounting device 24. This metal mounting device 24 is preferably made of brass or other good heat-conducting material. In one very satisfactory construction, the member 24 was made of semi-spring brass having a thickness of .012 of an inch. The mounted member is formed to provide a hollow cylindrical portion 25 which is split longitudinally as shown in 26, and a lip or ear 27 which extends endwise from one end of the tubular portion 25. The heating cartridge 9 is positioned in the tubular housing 25 and is held in place between an ear or a tang 28 which is struck inwardly out of a portion of the lip 27 adjacent one end of the housing 25, and an ear 29 which extends integrally from the other end of the housing and is bent inwardly across the same.

The thermostatic element 20 is a commercially available unit, the operating elements of which are housed within a porcelain or similar body. This thermostatic element is secured in fixed position on the lip 27 by any suitable means such as ears indicated at 30 which are formed integral with the lip 27 and are bent upwardly and then inwardly over the member 20, the upper end portions of said ears being seated in recesses provided in the upper surface of the thermostat 20 so that the thermostat is effectively held against shifting along the lip 27.

The free end of the leg 2 of the heater is closed by means of a suitable cap 31 which may be brazed or otherwise fixedly secured to the leg 2 and sealed thereto to prevent the passage of liquid into the tube in the free end of the lower leg 2. The electric heater cartridge housing is provided with another ear 32 at its outer end, this ear 32 being bent around the capped end portion of the leg 2 and tightly clamped between the flange of the cap 31 and the outside of the tube portion 2 so as to produce an electrical connection between the cartridge mounting member 24 and the tube 1. The slight gap that exists between a portion of the flange of the cap 31 and the outside of the wall of the tube 2 incident to the presence of the ground connecting element 32 is effectively sealed against leakage by silver soldering or brazing which is applied to fasten the cap in place on the tube 2 after the heating unit is inserted in the leg 2. The other end of the mounting member 24 is connected through the third conductor 33 of the cable 12 to a grounding wire 34 which extends out of the connector plug 13 for attachment to a suitable ground connection.

During the assembling of the described structure, the heating cartridge and thermostatic unit may initially be connected to the wires of the cable 12. Before attachment of the connector plug 13 to the cable, the cable is threaded through the tube 1 from the open end of its leg 2 to the upper end of the device, the wire emerging through the adaptor 15 which is all ready in place. The holder mounted thermostat and cartridge follow the conductor into the leg 2 of the tube and the lip portion 27 of the holder will readily conform itself to the curvature of the tube 1 between its portions 2 and 3 as shown in Figure 1. The split tubular housing portion 25 of the holder and the cartridge 9 are of such size that the tubular portion 25 will fit very snugly within the tube 2 and maintain good frictional contact therewith and with the cartridge. The tubular housing portion 25 is so formed that when it is closed around the cartridge 9, the outside of the housing 25 will have a clearance of about .015 of an inch in the tube portion 2. Such clearance provides a tight fit of the tubular holder part in the leg 2 and secure holding of the cartridge in fixed position. However, slight irregularities in the formation of the tubular portion, which are difficult to avoid in the commercial manufacture of the member 24, insure tight contact of the tubular portion 25 of the holder with the inside wall of the leg part 2 and with the cartridge 9 so that the latter will be firmly held in fixed position in said leg 2. During insertion of the holder 24 into the tube portion 2, with the heating cartridge and thermostat secured to the holder, the thermostat carrying lip portion 27 of the holder engages and substantially conforms to the curved or bent portion of the tube 1 between the leg 2 and upwardly extending portion 3 of the tube.

The mounting of the electric cartridge 9 and the thermostat 20 on a one-piece heat conducting metallic member insures efficient and substantially constant transmission of heat from the cartridge to the thermostat at a substantially uniform rate. Hence, actuation of the thermostat is not dependent upon mere radiation or other forms of heat transfer which are less dependable for constancy than the described heat-conducting metal arrangement. Also, the fixed relationship which exists between the heating cartridge and the thermostat, contributes to uniformity of action by the thermostat in relation to the temperature of the surrounding structure and liquid.

In a practical embodiment of the device employed in connection with a vacuum insulated container of the character above mentioned, coffee was maintained at a temperature within the range at about 180° F. to 175° F. over a period of many hours. A recording thermometer chart shows that one device according to the present invention maintained the temperature of coffee in a container of the character indicated within a temperature of about 175° to 180°. The temperature gradually fell over a period of about 30 to 40 minutes from 180° to about 175° and then rose within a period of about 5 minutes to 182°. Coffee within a temperature range of from about 170° to 182° is considered to be in excellent condition for serving so that the result obtained as above explained, is considered quite satisfactory. (All temperatures referred to are Fahrenheit.)

To attain the indicated desirable result, the thermostat 20 was one which is calculated to open the heating circuit at a temperature of about 195° and to close said circuit at a temperature of about 170°.

It appears that in order to get the coffee or other liquid food up to a temperature of about 182°, the heating unit must be kept energized and at a temperature somewhat in excess of 195° until sufficient heat is transmitted to the coffee (or other liquid) to also cause the temperature of the thermostat to rise to about 195° at which time the thermostat opens the heating circuit. The drop in temperature of liquid contained in the receptacle is generally accompanied by almost the same drop in temperature in the immersed part of the device so that when the liquid temperature drops to say 170° the thermostat 20 will also be cooled to that point and will close the heating circuit to energize the heating device. The drop in temperature of liquid in which the device is immersed, appears to be followed quite closely by a drop in temperature in the heating element 9, its housing 25, lip 27 and thermostat 20, probably due to the good thermo-conducting contact which is maintained between the holder 24 and the tube 2 and between the thermostat and the heating cartridge, as already explained.

By so mounting the heating unit 9 in the portion 2 of the device that the heating unit is held in fixed position in the device together with the thermostat, the heating unit is protected against injury which might occur if the heating cartridge and thermostat are permitted to shift even to a very limited extent either or both radially or longitudinally within the tube portion 2. Furthermore with a loosely fitting heating unit, heat transmission to the liquid in which the device is immersed is less efficiently effected. The fixed position of the thermostat insures that it will be activated by heat transmitted to and from it under substantially constant conditions whereas when the thermostat is free for movement within the tube the transmission of heat to and from the thermostat varies in accordance with the changes of positions of the parts. This, of course, had a tendency to impair the constancy or uniformity of action of the thermostat with reference to the temperatures in the liquid in which the device was immersed, and other damage may also possibly occur as an incident to shifting of the parts when they are not fixedly mounted as herein explained.

The device as above described and shown in the drawing has proven itself to be highly efficient in actual use for maintaining coffee temperatures in vacuum insulated containers of the type described from which coffee is served cup by cup throughout extended periods such as 24 hour periods in which filled containers are delivered to replace emptied or partially emptied containers.

Various changes in the described construction may be made while retaining the principles of the invention.

I claim:

1. An immersion heater of the class described, having an elongated tube bent to provide an upper stem portion and a lower portion which extends transversely of said stem portion, an electric heating element and an electrical circuit making and breaking thermostat housed in said lower portion of the tube, electrical wiring connecting said heating element and thermostat and extending through said tube and out of the upper end of said stem portion for connection to a source of electrical current, and a metal holder for said heating element and thermostat comprising a portion which has tight contact with said tube and heater so as to hold the heating element in substantially fixed position in the tube and transmit heat from said heating element to said tube, and a portion to which said thermostat is secured so as to be held in fixed relation to said heater.

2. An immersion heater of the class described, having an elongated tube bent to provide an upper stem portion and a lower portion which extends transversely of said stem portion, an electric heating element and an electrical circuit making and breaking thermostat housed in said lower portion of the tube, electrical wiring connecting said heating element and thermostat and extending through said tube and out of the upper end of said stem portion for connection to a source of electrical current, and a holder for said heating element and thermostat comprising a metal member embodying a tubular housing portion in which said heating element is seated, a lip extending from one end of said housing portion and having said thermostat mounted thereon, said housing portion being of a diametrical size which, when positioned in said lower portion of the tube, is a snug fit in the tube and snugly embodies said heating element so as to hold the latter in substantially fixed position in the tube and transmit heat from said heating element to said tube, said lip extension serving to conduct heat from said heating element to said thermostat for control of the flow of electrical current to said heating element.

3. An immersion heater of the class described having an elongated tube bent to provide an upper stem portion and a lower portion which extends transversely of said stem portion, an electric heating element and an electrical circuit making and breaking thermostat housed in said lower portion of the tube, electrical wiring connecting said heating element and thermostat and extending through said tube and out of the upper end of said stem portion for connection to a source of electrical current, and a holder for said heating element and thermostat comprising a metal member embodying a spring metal tubular housing portion in which said heating element is seated, and a lip extending from one end of said housing portion and having said thermostat mounted thereon, said tubular housing portion being of a diametrical size which, when positioned in said lower portion of the tube is, by engagement with the tube, compressed to a snug fit around the heating element so as to hold the latter in substantially fixed position in the tube.

4. An immersion heater of the class described having an elongated tube bent to provide an upper stem portion and a lower portion which extends transversely of said stem portion, an elongated cartridge type electric heating element housed in said lower portion of the tube, electrical wiring connected to said heating element and extending through said tube and out of said stem portion for connection to a source of electrical current, and a holder for said heating element comprising a spring metal member embodying an elongated, longitudinally slitted tubular housing in which said heating element is seated, ears extending from said housing into overlying relation to the opposite ends of said heating element to restrain the same against endwise movement in said housing, said tubular housing containing said heating element being insertable as a unit into said lower portion of the tube, and said housing being of a diametrical size which is a snug fit in the tube and also snugly embraces said heating element so as to hold the latter in substantially fixed position in the tube and efficiently transmit heat from said heating element to said tube.

5. An immersion heater of the class described having an elongated tube bent to provide an upper stem portion and a lower portion which extends transversely of said stem portion and is connected thereto by a longitudinally curved portion of the tube, an electric heating element and an electrical circuit making and breaking thermostat housed in said lower portion of the tube, electrical wiring connecting said heating element and thermostat and extending through said tube and out of the upper end of said stem portion for connection to a source of electrical current, and a holder of said heating element and thermostat comprising a metal member embodying a tubular housing portion in which said heating element is seated, a lip extending from one end of said housing portion and having said thermostat mounted thereon, said housing being of a diametrical size which, when positioned, in said lower portion of the tube, is a snug fit in the tube and snugly embraces said heating element so as to hold the latter in substantially fixed position in the tube, said lip extension being flexible so as to be conformable to said longitudinally curved portion of the tube as an incident to engagement therewith when said holder is seated in said tube as aforesaid.

References Cited in the file of this patent

UNITED STATES PATENTS

| | | |
|---|---|---|
| 2,471,260 | Chapman | May 24, 1949 |
| 2,501,417 | Smits et al. | Mar. 21, 1950 |